(12) United States Patent
Lopez et al.

(10) Patent No.: US 10,825,108 B1
(45) Date of Patent: Nov. 3, 2020

(54) SYSTEM, METHOD, AND COMPUTER PROGRAM FOR DYNAMICALLY RECONCILING A DISTRIBUTOR INVOICE WITH A RETAILER RECEIVING INVOICE FOR PRODUCTS SOLD UNDER MULTIPLE UPCS AND IN MULTIPLE QUANTITY UNITS

(71) Applicant: iControl Systems USA, LLC, Burtonsville, MD (US)

(72) Inventors: Mark Edward Lopez, Rockville, MD (US); William Arthur Heine, Springfield, VA (US); Kent Donavan McKinstray, Buford, GA (US); Gilad Keren, Rockville, MD (US)

(73) Assignee: ICONTROL SYSTEMS USA, LLC, Burtonsville, MD (US)

( * ) Notice: Subject to any disclaimer, the term of this patent is extended or adjusted under 35 U.S.C. 154(b) by 0 days.

(21) Appl. No.: 16/151,916

(22) Filed: Oct. 4, 2018

Related U.S. Application Data

(63) Continuation of application No. 15/004,557, filed on Jan. 22, 2016, now Pat. No. 10,134,093.

(60) Provisional application No. 62/271,589, filed on Dec. 28, 2015.

(51) Int. Cl.
| | |
|---|---|
| *G07F 19/00* | (2006.01) |
| *G06Q 40/00* | (2012.01) |
| *G06K 7/14* | (2006.01) |
| *G06F 16/34* | (2019.01) |

(52) U.S. Cl.
CPC ........... *G06Q 40/12* (2013.12); *G06F 16/345* (2019.01); *G06K 7/1413* (2013.01)

(58) Field of Classification Search
CPC ..... G06Q 40/12; G06F 16/345; G06K 7/1413
USPC ...................................................... 705/16, 30
See application file for complete search history.

(56) References Cited

U.S. PATENT DOCUMENTS

| | | | |
|---|---|---|---|
| 5,537,586 A * | 7/1996 | Amram | G06F 16/353 |
| 6,820,111 B1 * | 11/2004 | Rubin | G06F 16/9562 709/203 |
| 8,855,425 B2 * | 10/2014 | Schmidtler | G06K 9/00469 382/182 |
| 2002/0107861 A1 * | 8/2002 | Clendinning | G06F 16/283 |
| 2003/0105682 A1 * | 6/2003 | Dicker | G06Q 30/0633 705/26.8 |
| 2003/0204449 A1 * | 10/2003 | Kotas | G06Q 10/087 707/781 |

\* cited by examiner

*Primary Examiner* — Rokib Masud
(74) *Attorney, Agent, or Firm* — Lessani Law Group, PC

(57) ABSTRACT

The present disclosure describes a system, method, and computer program for dynamically reconciling a retailer receiving invoice with a distributor invoice for products sold and invoiced under multiple UPC codes and in multiple units of quantity. A retailer receiving invoice is matched to to a distributor invoice. For each line item in both invoices, the UPC, quantity, and unit-price are normalized. Invoiced UPCs are normalized to a hierarchy level in a product family a master product database. Also, invoiced unit prices are compared to upper and lower price limits for invoiced UPCs to determine whether an invoiced UPC correlates to an invoiced unit price. Quantity and unit-price are normalized by converting price-correlated units to base-level units in a product hierarchy. Normalized UPCs, quantities, and unit price are compared to match line items across invoices and discover any discrepancies. Credits are matched to discrepancies.

9 Claims, 9 Drawing Sheets

US 10,825,108 B1

SYSTEM, METHOD, AND COMPUTER PROGRAM FOR DYNAMICALLY RECONCILING A DISTRIBUTOR INVOICE WITH A RETAILER RECEIVING INVOICE FOR PRODUCTS SOLD UNDER MULTIPLE UPCS AND IN MULTIPLE QUANTITY UNITS

RELATED APPLICATIONS

This application is a continuation of U.S. patent application Ser. No. 15/004,557, filed on Jan. 22, 2016, and titled "System, Method, and Computer Program for Dynamically Reconciling a Distributor Invoice with a Retailer Receiving Invoice for Products Sold under Multiple UPCs and in Multiple Quantity Units," which claims the benefit of U.S. Provisional Patent Application No. 62/271,589, filed on Dec. 28, 2015, and titled "System, Method, and Computer Program for Dynamically Reconciling a Distributor Invoice with a Retailer Retailing Invoice for Products sold under Multiple UPCs and in Multiple Quantity Units." The contents of the foregoing patent applications are incorporated by reference as if fully disclosed herein.

BACKGROUND OF THE INVENTION

1. Field of the Invention

This invention relates generally to invoice reconciliation and, more specifically, to dynamically reconciling a distributor invoice with a retailer receiving invoice for products sold under multiple Universal Price Codes and in multiple units of quantity.

2. Description of the Background Art

There are many state laws that date back to the Prohibition regarding the timing of payments for alcohol. Often times, payment has to be made at the time of delivery, and the receiving retailer pays the amount of the distributor's invoice at the time of delivery. However, the amount invoiced by the distributor is not always the same as the amount received by the retailer. For example, several bottles may break or be stolen in transit. The retailer generates a receiving invoice with the products and quantities received ("the retailer receiving invoice"). Theoretically, if there is a discrepancy between the amount invoiced by the distributor and the amount received by the retailer, the retailer should be billed or credited accordingly. However, in reality, it is often very difficult to reconcile the distributor and retailer invoices. Alcohol is usually sold and priced in various units (e.g., case, pack, bottle), where each quantity unit is associated with a different Universal Price Code (UPC). This makes it very difficult to reconcile invoices because line items for the same product delivery may cite different UPCs, quantity units, and unit prices. For example, a distributor invoice for one case of beer may list the UPC for case, the quantity of cases (i.e., 1), and the case price (e.g., $24). However, the retailer receiving invoice may list the UPC for the 6-pack, the quantity of six packs received (e.g., 4), and the six-pack unit price (e.g., $6). The line items in the two invoices look completely different, but in reality are the same.

As a result of these difficulties, a lot of reconciliation is not done, and tolerance levels are set instead. The results in a very inefficient and costly process to handle alcohol invoices. Therefore, there is a need for a system for dynamically and accurately reconciling distributor and retailer invoices.

SUMMARY OF THE DISCLOSURE

The present disclosure describes a system, method, and computer program for dynamically reconciling a retailer receiving invoice with a distributor invoice for products sold and invoiced under multiple UPCs and in multiple units of quantity, such as alcohol. The method is performed by a computer system.

The system creates a first computer-readable record for the distributor invoice. The first record includes an entry for each line item (i.e., invoiced product) in the distributor invoice. Each line-item entry includes an invoiced UPC, an invoiced quantity, and an invoiced unit price from the applicable line item on the invoice, as well as fields for a normalized UPC variable, a normalized quantity variable, a normalized unit price variable, and a price-correlated UPC variable.

The system creating a second computer-readable record for the retailer receiving invoice. The second record includes an entry for each line item in the retailer receiving invoice. Each line-item entry includes an invoiced UPC, an invoiced quantity, and an invoiced unit price from the applicable line item on the invoice, as well as fields for a normalized UPC variable, a normalized quantity variable, a normalized unit price variable, and a price-correlated UPC variable.

Normalizing the UPC Values

For each entry in each of the first and second records, the system determines a value for the normalized UPC variable. To do so, the system determines whether the invoiced UPC for the entry is in a master product database for a plurality of products. For each product in the master product database, the master product database includes (1) a hierarchical family of UPCs, each corresponding to a quantity unit in which the product is available, and (2) a lower price limit and an upper price limit for each UPC.

In response to the invoiced UPC for the entry matching a UPC in a family of UPCs in the master product database, the system retrieves a UPC in the family that corresponds to a select quantity unit (e.g., a case). The same select quantity unit is used for all entries in both the first and second records. The system sets the value of the normalized UPC variable for the entry to the retrieved UPC in the family.

Normalizing Unit Price and Quantity Values

For each entry in each record, system calculates the value of the normalized unit price and quantity variables for the entry. To do so, the system determines whether the invoiced unit price for the entry is within the lower and upper price limits associated with the invoiced UPC for the entry in the product database. In response to the invoiced unit price for the entry being within the upper and lower price limits, the system concludes that the invoiced UPC for the entry correlates with the invoiced unit price for the entry, and it sets the value of the price-correlated UPC variable for the entry to the invoiced UPC for the entry (i.e., price-correlated UPC=invoiced UPC).

In response to the invoiced unit price for the entry not being within the upper and lower price limits associated with the invoiced UPC for the entry, the system concludes that the invoiced UPC for the entry does not correlate with the invoiced unit price for the entry, and it determines whether the invoiced unit price for the entry falls within the lower and upper price limits associated with another UPC in the family of UPCs. In response to determining that the invoiced unit price for the entry falls within the upper and lower prices limits of another UPC in the family of UPC ("the identified UPC"), the system concludes that the identified UPC correlates with the invoiced unit price for the entry, and it sets the price-correlated UPC variable for the entry to the identified UPC (i.e., price-correlated UPC=identified UPC).

The system then determines whether the price-correlated UPC for the entry is a base item in the family of UPCs. In response to determining that the price-correlated UPC for the entry is a base item in the family of UPCs, the system sets the normalized unit price and quantity fields for the entry to the invoiced unit price and quantity for the entry (i.e., normalized quantity=invoiced quantity, normalized unit price=invoiced unit price.).

In response to determining that the price-correlated UPC for the entry is not a base item in the family of UPCs, converting the invoiced unit price and invoiced quantity from the price-correlated UPC units to base unit values and setting the normalized unit price and quantity fields for the entry to the calculated unit price and quantity in base unit values (i.e., normalized quantity=calculated quantity in base units, normalized unit price=calculated unit price in base units).

Reconciling Invoices Using the Normalized UPCs, Quantity, and Unit Price Values

The system determines whether entries in the first and second records are for the same product by comparing the normalized UPC fields in each record. The system flags any non-matching entries as unmatched products. For each matching entry pair, system compares the normalized quantity and normalized unit price fields for the entries to determine if there are any quantity or unit price discrepancies between the corresponding line items in the distributor and retailer invoices.

The above-described reconciliation process enables the system to product insightful analytics, such whether a credit is due to the retailer, whether the distributor is charging too much or too little for a product, and whether the distributor has submitted an invoice for the merchandise.

DETAILED DESCRIPTION OF THE PREFERRED EMBODIMENTS

Figure 1A:
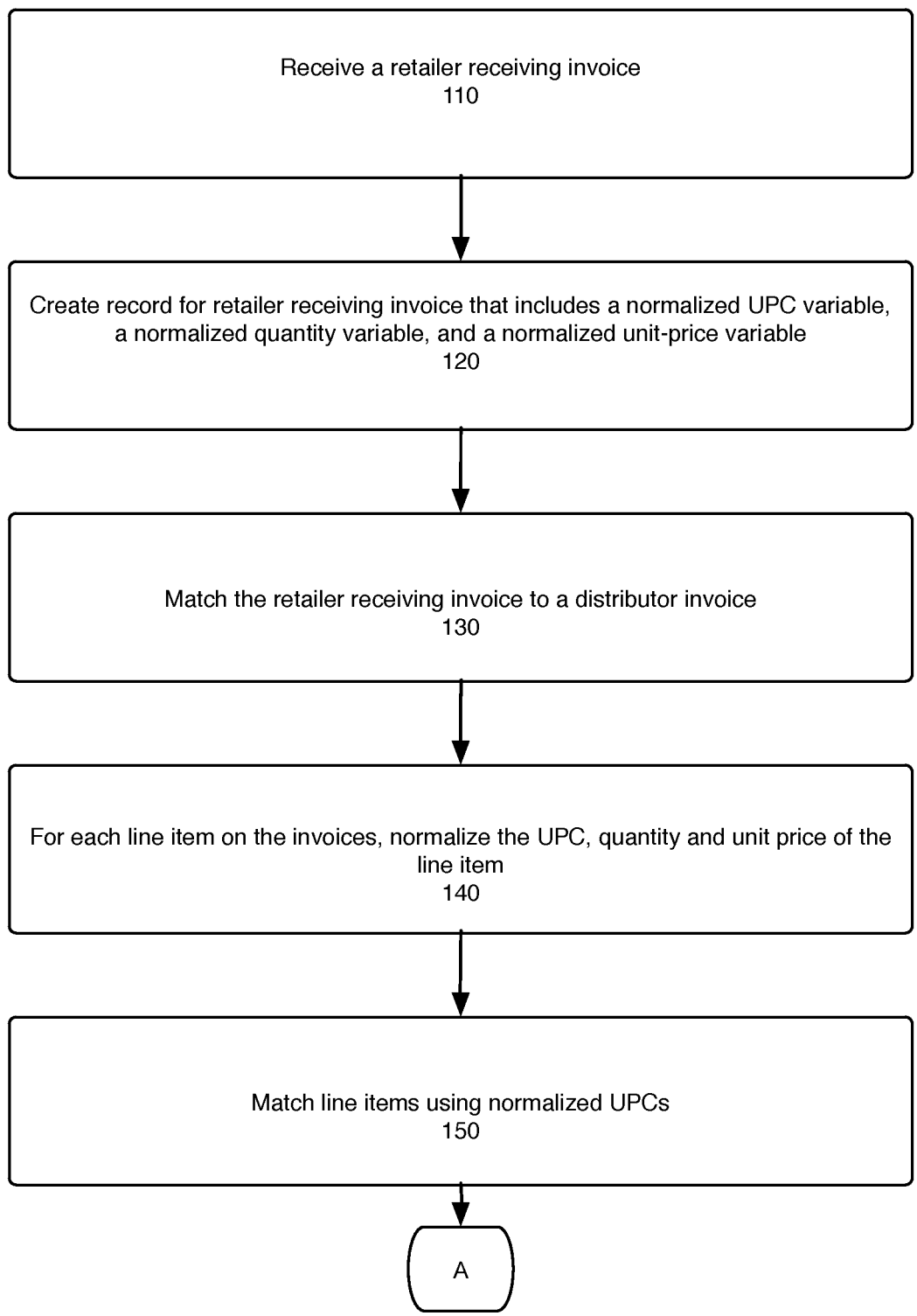
FIGS. 1A-1B are flowcharts that illustrate a method, according to one embodiment, for dynamically reconciling a retailer receiving invoice with a distributor invoice for products sold and invoiced under multiple UPC codes and in multiple units of quantity.
Figure 1B:
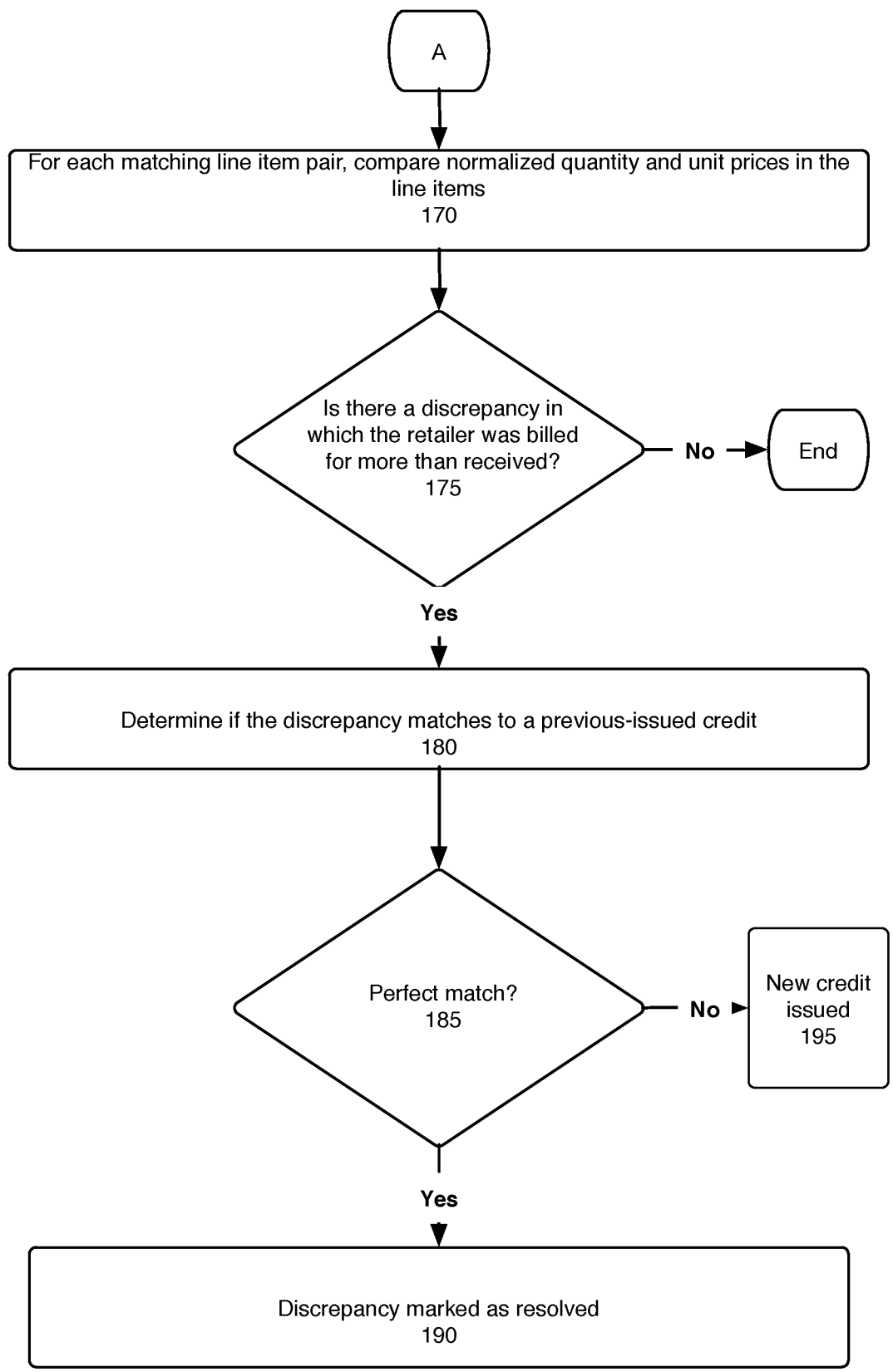

FIGS. 1A-1B illustrate a method for dynamically reconciling a retailer receiving invoice with a distributor invoice for products sold and invoiced under multiple UPC codes and in multiple units of quantity. The method is performed by a computer system (the "system").

The system receives a retailer receiving invoice and creates a computer-readable record for the invoice (steps 110, 120). The record includes a purchase order number, a retailer name, a store number, an invoice number, and a date. A record also includes an entry for each line item (i.e., each listed product) in the invoice (a "line-item entry"). In one embodiment, each line-item entry includes an invoiced UPC, invoiced quantity, and invoiced unit price for the line item, as well as fields for a normalized UPC variable, a normalized quantity variable, a normalized unit-price variable, and a price-correlated UPC variable for the line item. The system obtains the invoiced UPC code, invoiced quantity, and invoiced unit price for each line item from the retailer receiving invoice. Values for the normalized UPC variable, normalized quantity variable, normalized unit-price variable, and price-correlated UPC variable are calculated as discussed below. The system also maintains a computer-readable record for each distributor invoice. The distributor invoice records include the same fields as described above.

The system attempts to match the retailer receiving invoice to a distributor invoice (step 130). In one embodiment, the system first attempts to match the invoices based on purchase order number. If there is no purchase order match, the system determines if the the retailer receiving invoice matches a distributor invoice in certain key fields, such as distributor invoice number (which the retailer receiving invoice will also reference), invoice date, invoiced dollar amount, and the number of line items. If all the fields match, the system determines that the invoices match. In certain embodiments, "fuzzy matching" is used to determine whether one or more fields match. For example, in one embodiment, invoices are deemed to match if the invoice number, invoice date, invoiced amount, and the number of line items match within a specified tolerance. For the invoice date, the tolerance may be a certain number of days (e.g., 1 day). For the invoice number, the tolerance may be a certain number of differences between the invoice numbers (e.g., a specified Levenshtein difference) or a minimum-length longest common substring. For the invoiced amount, the tolerance may be a certain percentage (e.g., 98%). For the number of line items, the tolerance may be a certain number of line items (e.g., a difference of 1 in the number of line items). The amount of tolerance allowed may be customized for each retailer. If the retailer receiving invoice is not deemed to match any distributor invoice, the retailer receiving invoice is flagged as unmatched.

In response to identifying a matching distributor invoice, the system attempts to reconcile both invoices. For each invoiced product, the system normalizes the UPC used for the the product across invoices, as well as units used for quantity and price of the product (step 140). Specifically, for each line-item entry in each of the invoice records, the system determines the value of the normalized UPC variable, normalized unit price variable, and normalized quantity variable. Example methods for determining each of these values are described with respect to FIG. 2 and FIGS. 3A-3B.

The system matches line items between the invoices using the normalized UPCs (step 150). Any unmatched line items are flagged as unmatched products (step 160).

For each matching line-item pair, the system compares the normalized quantity and unit prices in the line items to determine if there are any discrepancies between the line items (step 170).

If there is a discrepancy in which the retailer was billed by the distributor for more product than the retailer received, the system determines if the discrepancy matches processed credit to the retailer (step 180). If there is a perfect match, the discrepancy is marked as resolved (step 185, 190). If not, a new credit is issued to the retailer for the discrepancy (step 185, 195).

Normalizing UPCs

Figure 2:
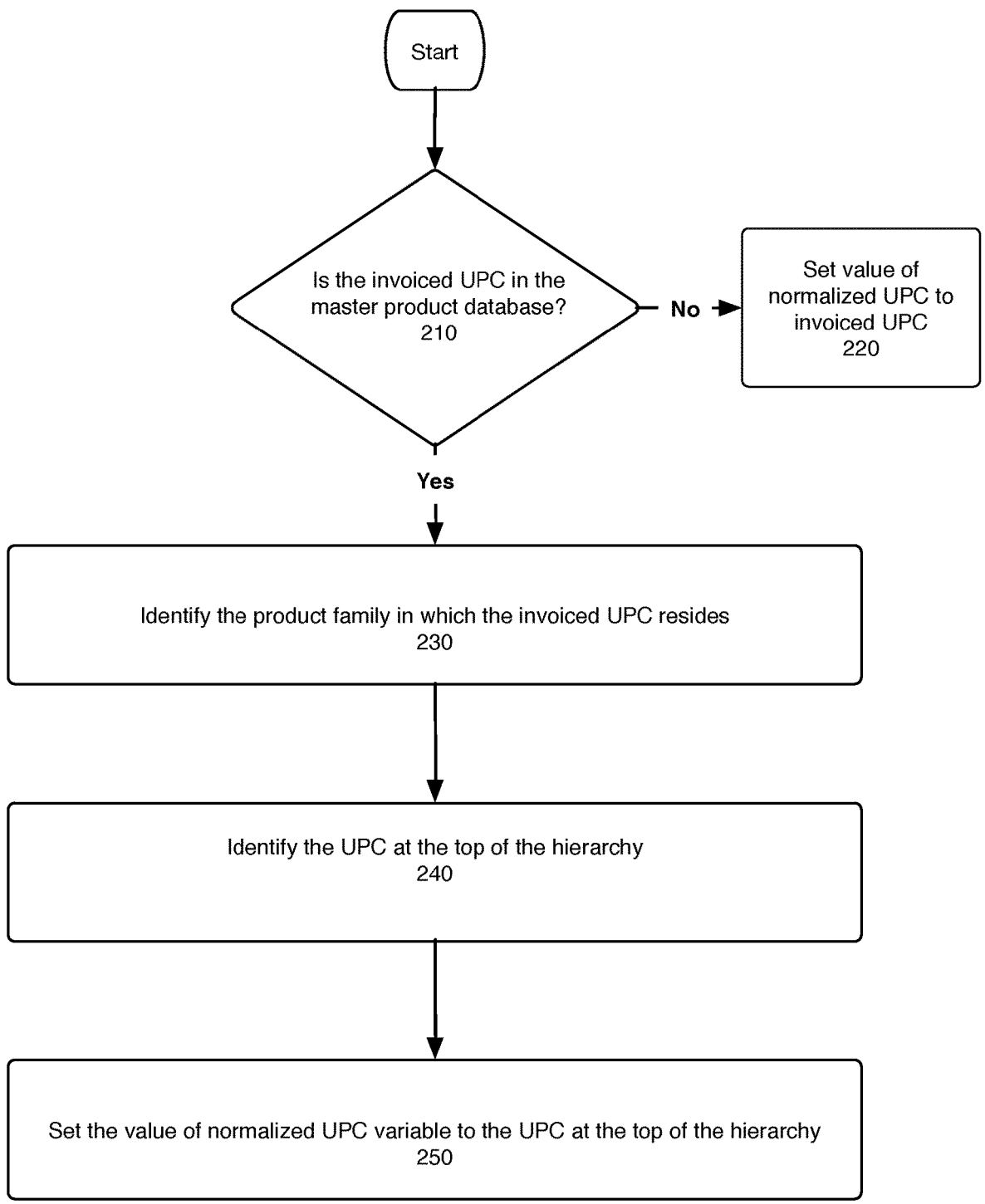
FIG. 2 is a flowchart that illustrate a method, according to one embodiment, for normalizing a UPC for a line item in an invoice.

FIG. 2 illustrates a method for normalizing a UPC for a line item in an invoice (i.e., determining the value of the normalized UPC code variable for the line item). This method is performed for each line item in the distributor invoice and each line item in the retailer receiving invoice. The system determines if the invoiced UPC (i.e., the UPC appearing on the invoice for the line item) is in a master product database (step 210). For each product in the master product database, the database includes a hierarchical family of UPCs, each corresponding to a quantity in which the product is available (e.g., case, pack, and bottle). The UPCs are hierarchical based on quantity size (e.g., large to small or small to large). If the invoiced UPC is not in the master product database, the system sets the value of the normalized UPC variable for the line item to the invoiced UPC (i.e., normalized UPC=invoiced UPC) (step 220).

If the invoiced UPC is in the master product database, the system identifies the product family in which the invoiced UPC resides (step 230). The system then identifies the UPC at the the top of the product family hierarchy (step 240), and sets the value of the normalized UPC variable to the UPC at the top of the hierarchy (i.e., normalized UPC=top-level UPC in product family) (step 250). For example, if a product is sold in either cases, packs, or bottles, the UPC for the case would be at the top of the hierarchy. In this example, the UPC at the top of the hierarchy was selected as the value of the normalized UPC variable. However, any level of the hierarchy (i.e., the UPC for any quantity level) can be chosen as long as it is the same across distributor and retailer invoices.

Normalizing Quantity and Unit Price

Figure 3A:
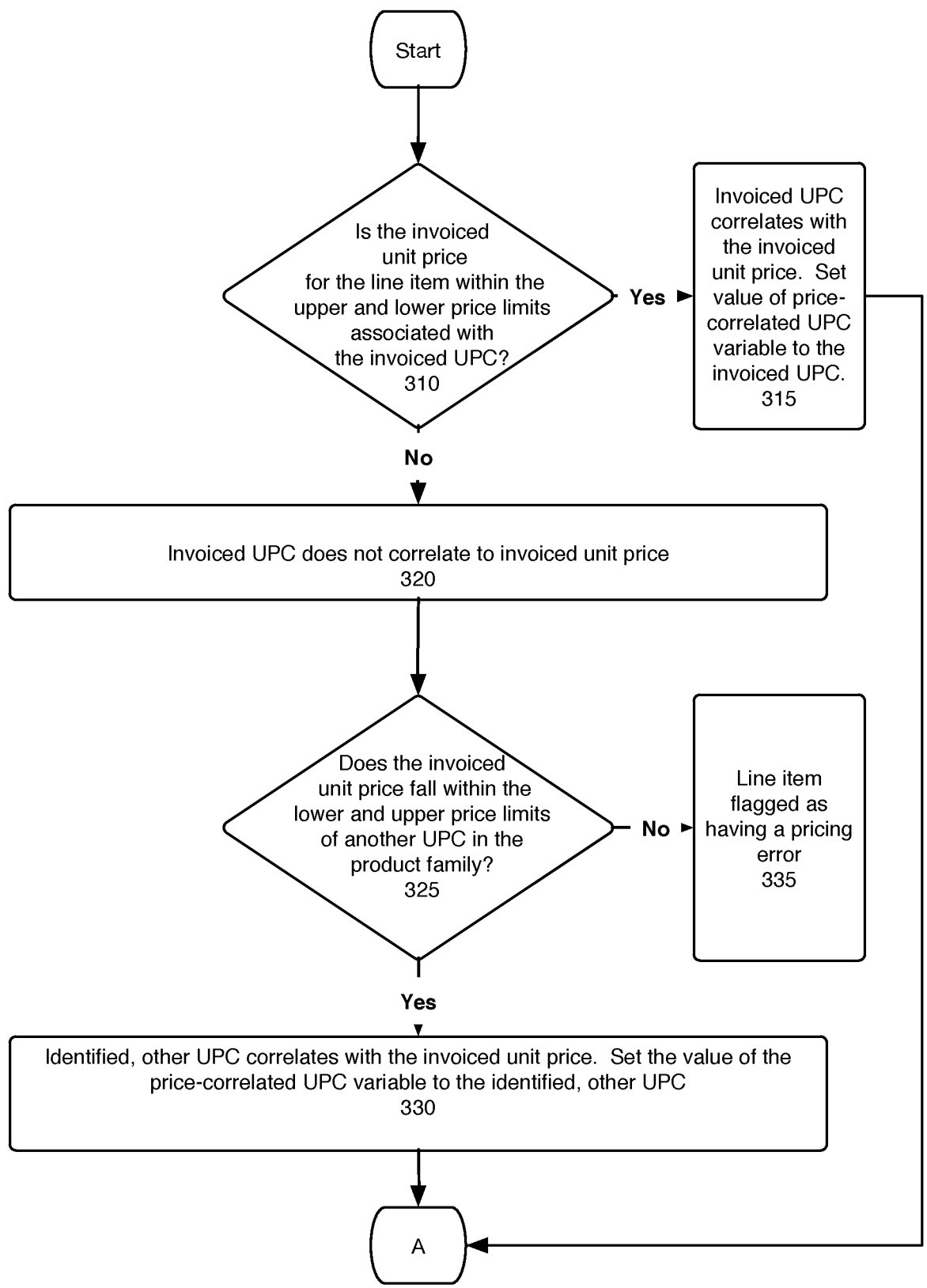
FIGS. 3A-B are flowcharts that illustrate a method, according to one embodiment, for normalizing the price and quantity for a product on an invoice.
Figure 3B:
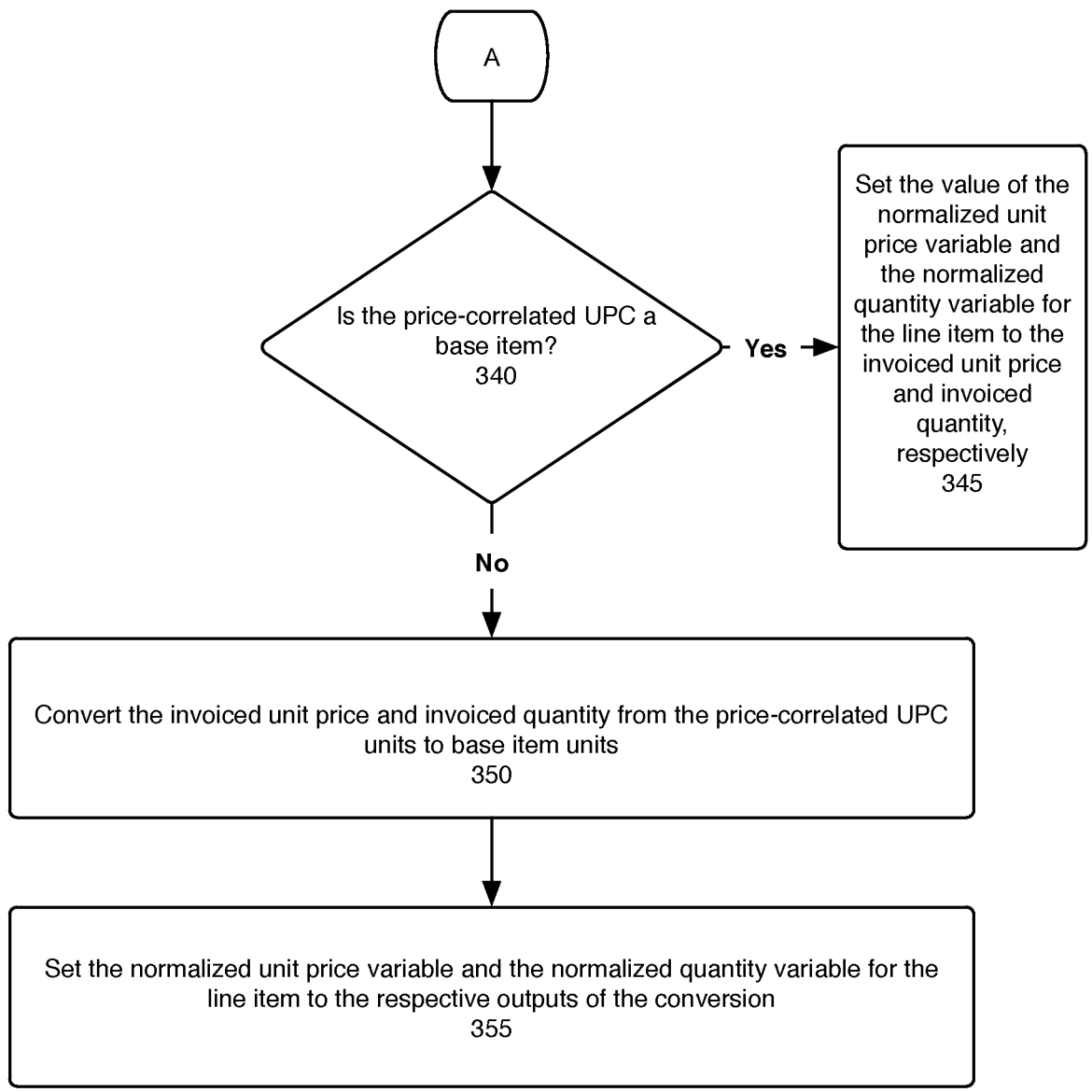

FIGS. 3A-3B illustrate a method for normalizing the price and quantity for a product on an invoice so that the prices and quantities for the product are based on the same units (e.g., case, pack, or bottle) across invoices. This method is performed for each line item in a distributor invoice and each line item in a retailer receiving invoice. For a line item, the system determines if the invoiced unit price for the line item is within upper and lower price limits associated with the invoiced UPC for the line item in the master product database (step 310). For example, if the UPC for a line item corresponds to a case of beer and the invoiced unit price is $24, the system determines whether $24 falls within the upper and lower price limits for the case of beer in the master product database. The upper and lower limit price limits are set based on historical price data per unit and a 99% confidence level requirement. If the invoiced unit price is within the upper and lower price limits for the invoiced UPC in the master product database, the system concludes that the invoiced UPC correlates with the invoiced unit price (i.e., the UPC is correct for the unit price), and it sets the value of the price-correlated UPC variable for the line item to the invoiced UPC (i.e., price-correlated UPC=invoiced UPC) (step 315) and proceeds to step 340.

If the invoiced unit price is not within the upper and lower price limits for the invoiced UPC, the system concludes that the invoiced UPC does not correlate with the invoiced unit price (step 320). The system then determines whether the invoiced unit price falls within the lower and upper price limits of another UPC within the product family (step 325). If so, the system concludes that the other identified UPC correlates to the invoiced unit price and sets the price-correlated UPC variable to the other identified UPC (i.e., price-correlated UPC=identified UPC) (step 330). For example, if the UPC for a line item corresponds to a case of beer and the invoiced unit price is $6, which is outside the price limits for the case but inside the price limits for a pack, the system sets the price-correlated UPC variable to the UPC for the pack. If the invoiced unit price does not fall within the lower and upper price limits of any UPC in the product family, the line item is flagged as containing a pricing error (step 335).

In step 340, the system determines if the price-correlated UPC is a base item in the product family in the master product catalog. The "base item" is the quantity unit used for the product for the purpose of normalization. In one embodiment, a base item is the lowest incremental quantity in which a product is sold. For example, if a beer product comes in case, pack, or bottle, the bottle would be the base item in this embodiment. However, for purposes of normalization, any quantity level (e.g., case, pack, or bottle) can be the base item level as long as it is the same across both distributor and retailer invoices. Therefore, "base item" as used herein is not limited to the lowest incremental quantity level but can be any level set by the system administrator. Also, the unit of quantity used to normalize UPCs need not be the same unit of quantity used to normalize unit price and quantity values.

If the price-correlated UPC is a base item, the system sets the normalized unit price and normalized quantity fields for the line item to the invoiced unit price and invoiced quantity, respectively, for the line item (i.e., normalized unit price=invoiced unit price, normalized quantity=invoiced quantity) (step 345).

If the price-correlated UPC is not a base item, the system converts the invoiced unit price and invoiced quantity from the price-correlated UPC units to base item units (step 350). The system the sets the normalized unit price variable and normalized quantity variables for the line item to the respective outputs of the conversion (i.e., normalized quantity=calculated quantity in base units, normalized unit price=calculated unit price in base units) (step 355). For example, assume that for a line item the price-correlated UPC is for a case, the invoiced quantity is 2, and the invoiced unit price is $26. If the base item level is the bottle and there are 24 bottles in a case, the normalized quantity for the line item would be 48 bottles (2×24) and the normalized unit price would be $26/24=$1.08 per bottle.

Reconciling Line Items

Figure 4A:
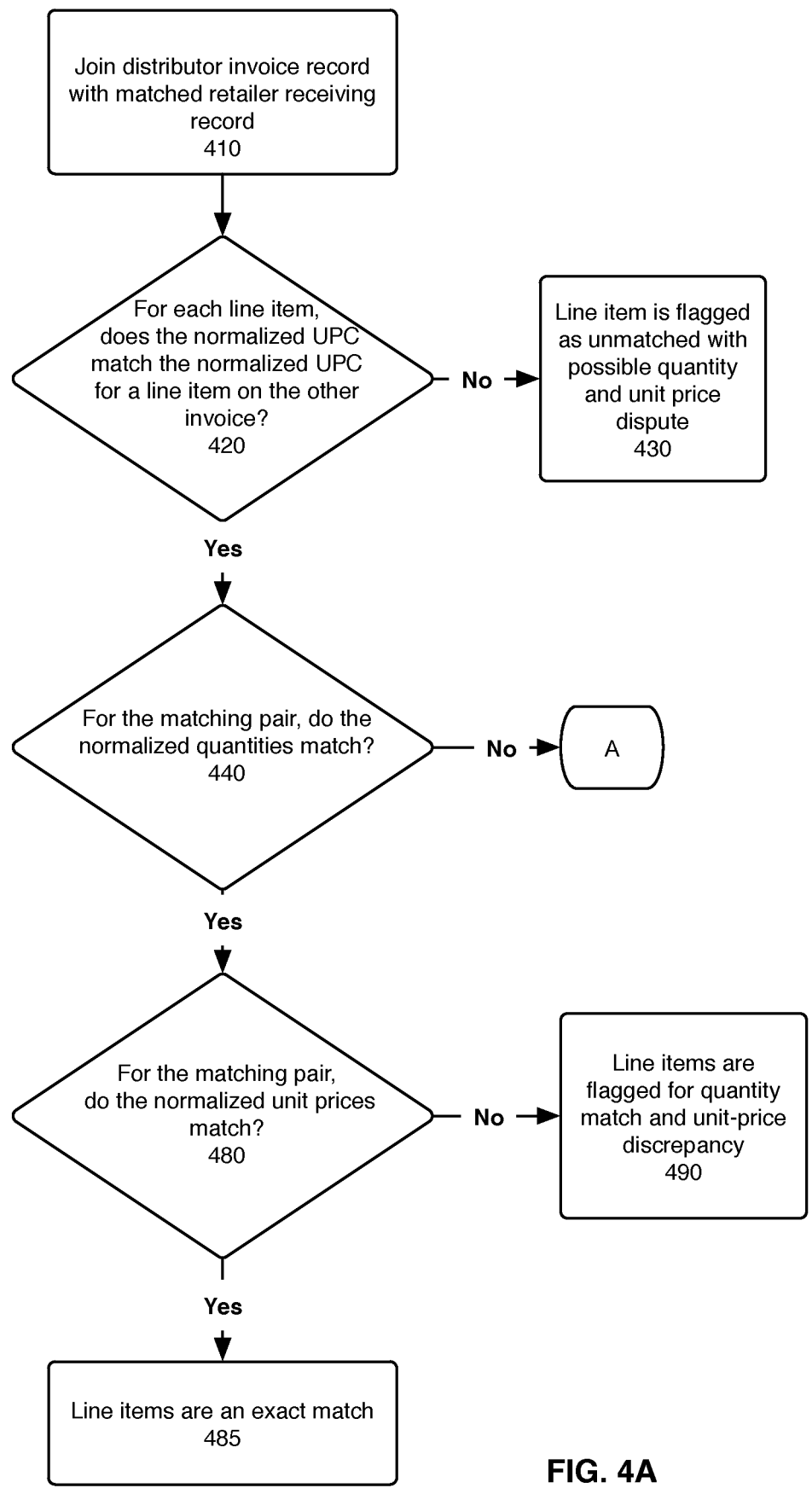
FIGS. 4A-4B are flowcharts that illustrate a method, according to one embodiment, for matching lines items in matched distributor and retail receiving invoices.
Figure 4B:
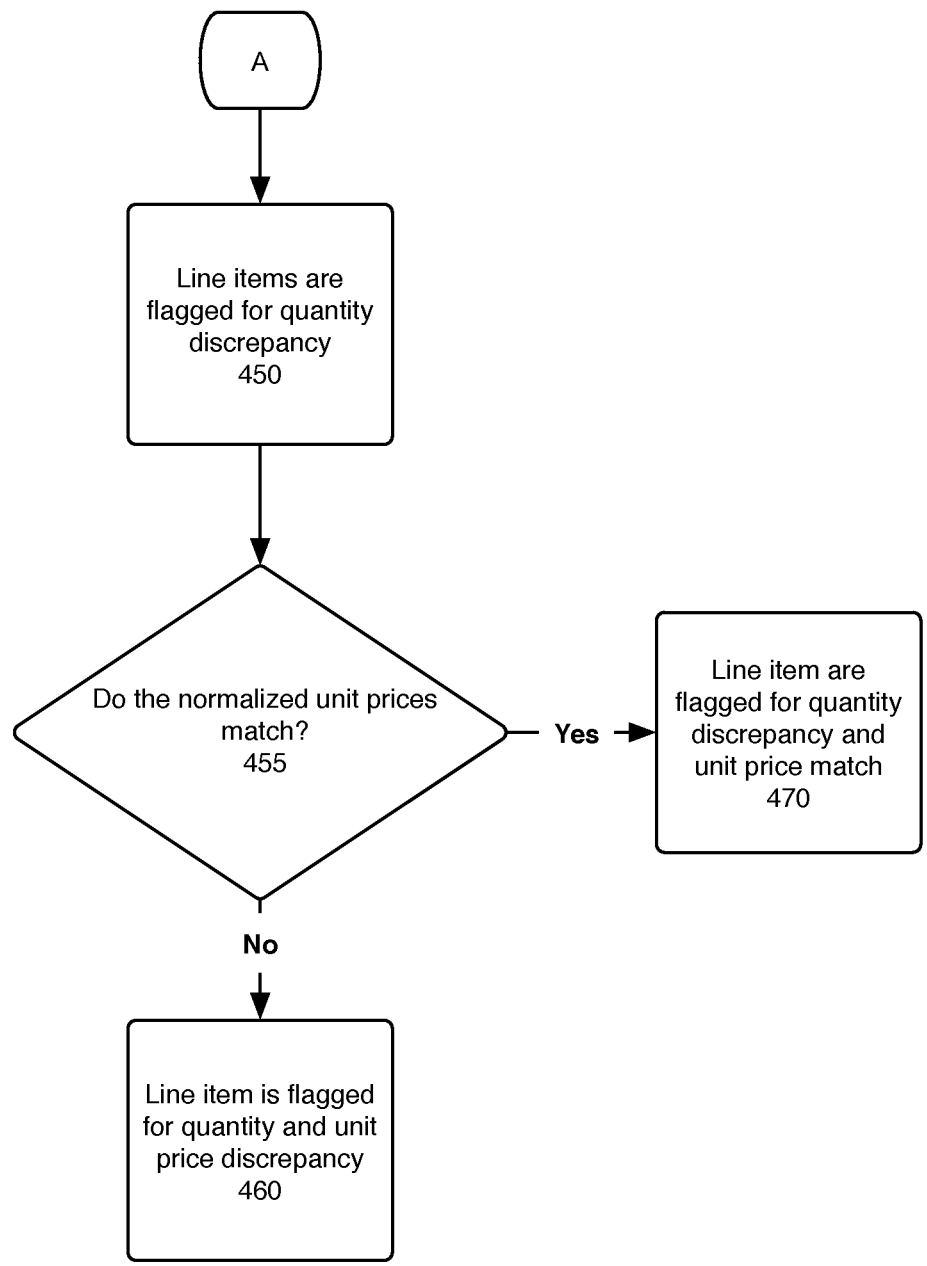

After a retailer receiving invoice has been matched to a distributor invoice and after the UPCs, unit price, and quantities have been normalized based on quantity units for all line items in the two invoices, the invoices can be reconciled for discrepancies. FIGS. 4A-4B illustrate a method for matching lines items in matched distributor and retail invoices. The system joins the distributor invoice record with matched the retailer receiving invoice record (step 410). For each line item on one invoice, the system determines if the normalized UPC matches a normalized UPC for a line item on the other invoice (step 420). If there is no match for a line item, the item is flagged as unmatched with a possible quantity and cost dispute (step 430). If two line items match, the system determines whether the normalized quantities match (step 440). If not, the line items are flagged for a quantity discrepancy (step 450). The system also determines if the normalized unit prices match (step 455), and, if not the line items are flagged for both quantity and unit price discrepancies (step 460). If the unit prices match, the line items are flagged for quantity discrepancy and unit-price match (step 470).

If the normalized quantities match in step 440, the system determines if the normalized unit prices match (step 480). If so, the line items are determined to be a perfect match with no discrepancies (step 485). Otherwise, the line items are marked for a quantity match and a unit price discrepancy (step 490). In one embodiment, a unit price or quantity difference is only deemed to be a discrepancy if the difference exceeds a threshold percent (e.g., the line items are more than 2% different).

The above-described line item reconciliation enables the system to produce insightful analytics, such whether a credit is due to the retailer, whether the distributor is charging too much or too little for a product, and whether the distributor has submitted an invoice for the merchandise.

Credit Matching

Figure 5A:
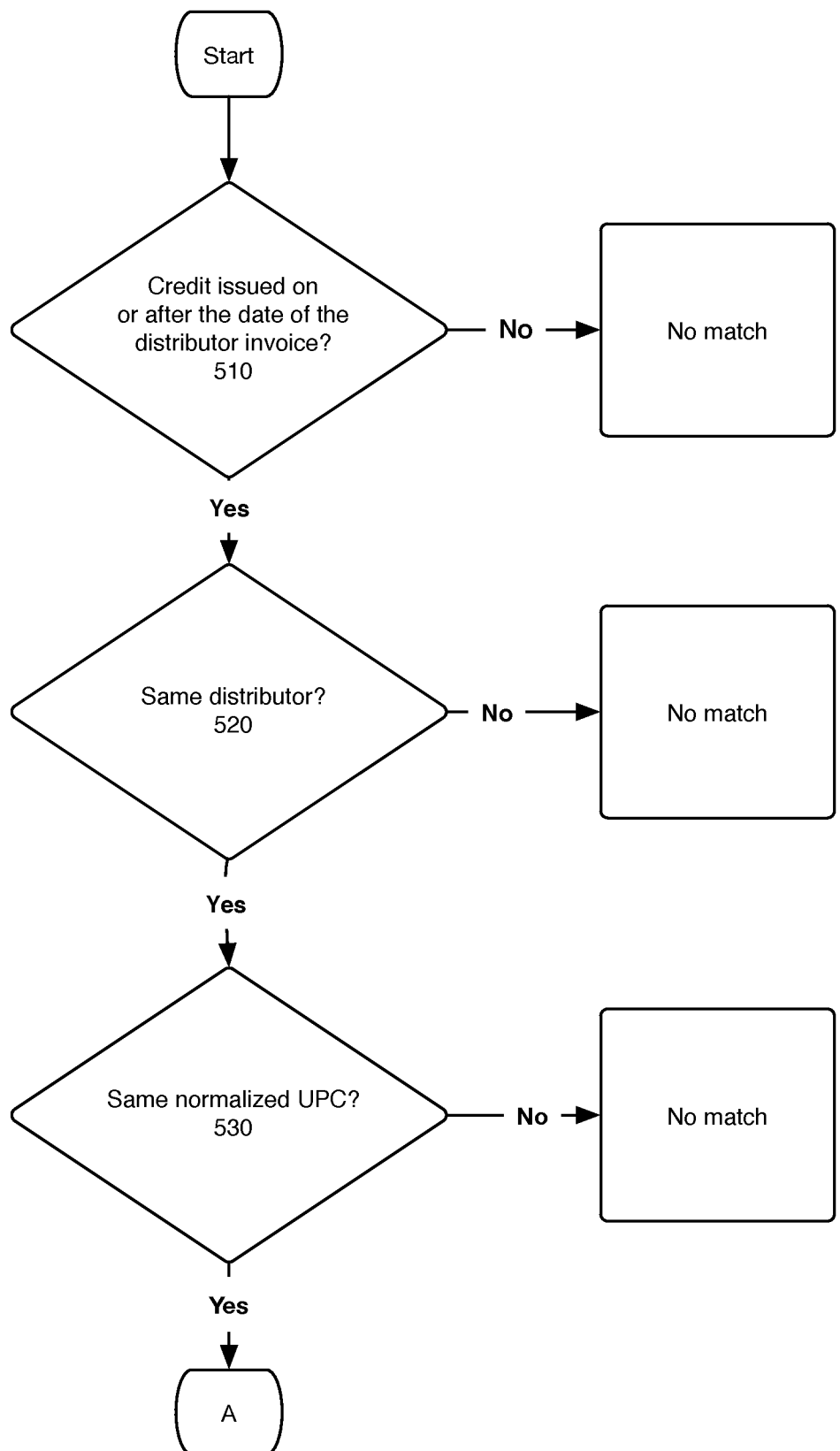
FIGS. 5A-5B are flowcharts that illustrate a method, according to one embodiment, for determining whether a price discrepancy can be matched to previously-issued credit.
Figure 5B:
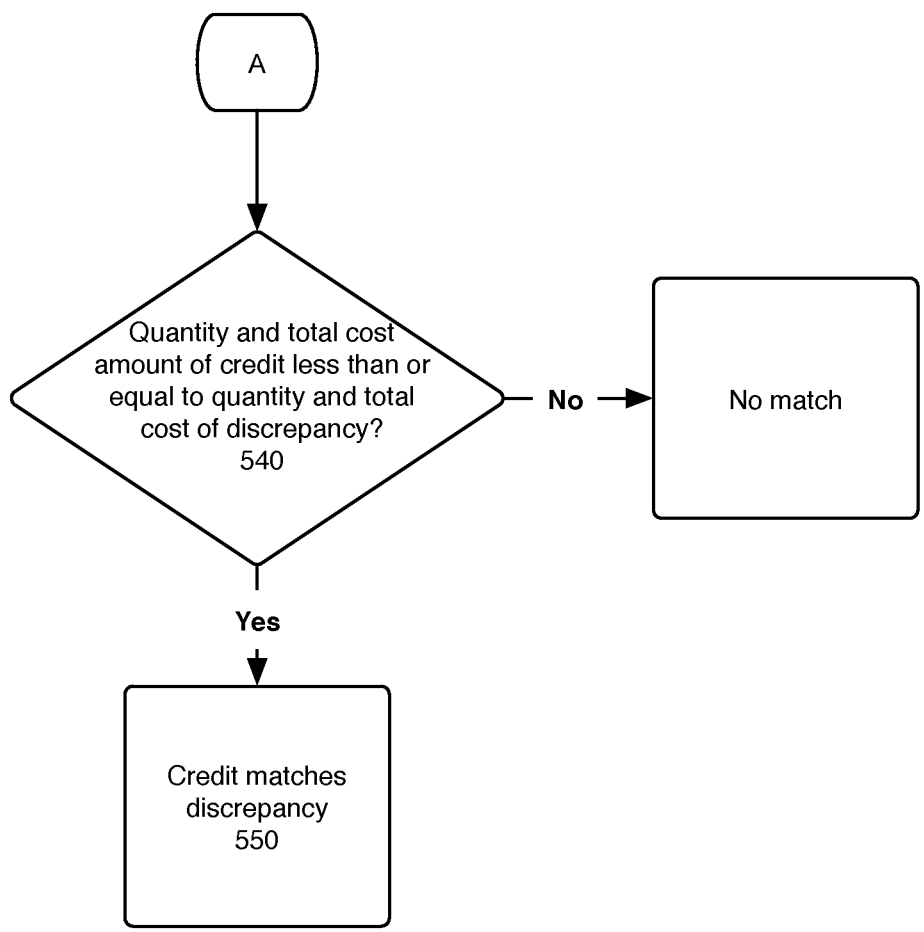

A quantity or unit price discrepancy between matching line items results in a total cost discrepancy for the line item. In one embodiment, if there is a discrepancy that results in the retailer being overcharged, the system determines whether a credit has previously been issued for the discrepancy. For example, if a delivery person reports that alcohol bottles broke on the way to a delivery, the supplier may issue a credit to the retailer same day. FIGS. 5A-5B illustrates a method for determining whether a total cost discrepancy can be matched to previously-issued credit. In this embodiment, UPCs, quantities, and unit prices on credit statements are normalized in the same manner as described with respect to FIG. 2. The method is performed for each unmatched credit in the system. The system determines whether an unmatched credit was issued prior to the distributor invoice (step 510). If so, there is no match. If the unmatched credit was issued on or after the distributor invoice date, the system determines whether the credit was issued from the same distributor as the distributor in the matching line items, whether the credit is for the same normalized UPC as the lines items, and whether the quantity and total cost amount (e.g., total dollar amount) of the credit is less than or equal to the quantity and total cost amount of the discrepancy (steps 520-540). If all the foregoing evaluates to true, the system determines that the credit matches the discrepancy (step 550). If the amount of the credit perfectly matches the amount of the discrepancy, the the discrepancy is marked as fully resolved. Otherwise, the discrepancy is marked as partially resolved and requiring further settlement processing. If one of steps 510-540 does not evaluate to true, the system concludes that the credit does not match.

If the system does not find a credit match, the system concludes that no credit has been issued for the discrepancy. In such case, the system may either automatically issue a credit for the discrepancy or flag the discrepancy for review.

The methods described with respect to FIGS. 1-5B are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system comprising one or more computing devices having one or more physical, computer-readable storage media and one or more processors, for dynamically reconciling a retailer receiving invoice with a vendor invoice for products sold and invoiced under multiple product identifiers and in multiple units of quantity, the method comprising:

maintaining a computer-readable record for each vendor invoice, wherein the record for each vendor invoice includes an entry for each line item in the vendor invoice, and wherein each entry includes an invoiced product identifier, an invoiced quantity, and an invoiced unit price from the applicable line item on the invoice, as well as fields for a normalized product identifier variable, a normalized quantity variable, a normalized unit price variable, and a price-correlated product identifier variable;

receiving a retailer receiving invoice;

creating a computer-readable record for the retailer receiving invoice, wherein the record for the retailer receiving invoice includes an entry for each line item in the retailer receiving invoice, and wherein each entry includes an invoiced product identifier, an invoiced quantity, and an invoiced unit price from the applicable line item on the invoice, as well as fields for a normalized product identifier variable, a normalized quantity variable, a normalized unit price variable, and a price-correlated product identifier variable;

matching the retailer receiving invoice to a vendor invoice;

for each entry in each of the record for the retailer receiving invoice and the record for the matched vendor invoice, determining a value for the normalized product identifier variable for the entry by performing the following:

determining whether the invoiced product identifier for the entry is in a master product database for a plurality of products, wherein, for each product in the master product database, the master product database includes (1) a hierarchical family of product identifiers, each corresponding to a quantity unit in which the product is available, and (2) an upper price limit and a lower price limit for each product identifier;

in response to the invoiced product identifier for the entry matching a product identifier in a family of product identifiers in the master product database, performing the following:

retrieving a product identifier in the family that corresponds to a select quantity unit, wherein the same select quantity unit is used for all entries in both the record for the retailer receiving invoice and the record for the matched vendor invoice;

setting the value of the normalized product identifier variable for the entry to the retrieved product identifier in the family;

for each entry in each record, calculating the value of the normalized unit price and quantity variables for the entry by performing the following:

determining whether the invoiced unit price for the entry is within the upper and lower price limits associated with the invoiced product identifier for the entry in the product database;

in response to the invoiced unit price for the entry being within the upper and lower price limits, concluding that the invoiced product identifier for the entry correlates with the invoiced unit price for the entry and setting the value of the price-correlated product identifier variable for the entry to the invoiced product identifier for the entry;

in response to the invoiced unit price for the entry not being within the upper and lower price limits associated with the invoiced product identifier for the entry, performing the following:

concluding that the invoiced product identifier for the entry does not correlate with the invoiced unit price for the entry;

determining whether the invoiced unit price for the entry falls within the upper and lower price limits associated with another product identifier in the family of product identifiers;

in response to determining that the invoiced unit price for the entry falls within the upper and lower prices limits of another product identifier in the family of product identifiers ("the identified product identifier"), concluding that the identified product identifier correlates with the invoiced unit price for the entry and setting the price-correlated product identifier variable for the entry to the identified product identifier, otherwise concluding an invoicing error occurred;

determining whether the price-correlated product identifier for the entry is a base item in the family of product identifiers;

in response to determining that the price-correlated product identifier for the entry is a base item in the family of product identifiers, setting the normalized unit price and quantity fields for the entry to the invoiced unit price and quantity for the entry;

in response to determining that the price-correlated product identifier for the entry is not a base item in the family of product identifiers, converting the invoiced unit price and invoiced quantity from the price-correlated product identifier units to base unit values and setting the normalized unit price and quantity fields for the entry to the calculated unit price and quantity in base unit values;

determining whether entries in the record for the retailer receiving invoice and the record for the matched vendor invoice are for the same product by comparing the normalized product identifier fields in each record;

flagging any non-matching entries as unmatched products;

for each matching entry pair, comparing the normalized quantity and normalized unit price fields for the entries to determine if there are any quantity or unit price discrepancies between the corresponding line items in the retailer receiving and matched vendor invoices;

in response to determining that there is a quantity or unit price discrepancy between the corresponding line items in the retailer receiving and matched vendor invoices, determining if the discrepancy matches a previously-issued credit; and in response to determining that the discrepancy matches a previously-issued credit, the discrepancy is marked as resolved.

2. The method of claim 1, wherein the system matches the retailer receiving invoice to a vendor invoice by performing the following:

determining if the retailer receiving invoice matches a vendor invoice in the following fields: retailer name, store number, invoice number, and invoice date; and in response to the retailer receiving invoice matching a vendor invoice in the fields, determining that the retailer receiving invoice corresponds to the vendor invoice.

3. The method of claim 1, wherein determining if the discrepancy matches a previously-issued credit comprises (i) identifying credits issued by the same vendor as the vendor of the line item on or after the date of the vendor invoice and (ii) by normalizing the product identifier, quantity, and unit prices referenced in the credit, and comparing the normalizing product identifier, quantity, and unit price associated with the credit with the normalized product identifier, quantity, and unit price associated with the discrepancy.

4. One or more non-transitory, computer-readable storage media comprising a computer program, that, when executed by a computer system comprising one or more computing devices having one or more processors, enables the computer system to perform the following method for dynamically reconciling a retailer receiving invoice with a vendor invoice for products sold and invoiced under multiple product identifiers and in multiple units of quantity, the method comprising:

maintaining a computer-readable record for each vendor invoice, wherein the record for each vendor invoice includes an entry for each line item in the vendor invoice, and wherein each entry includes an invoiced product identifier, an invoiced quantity, and an invoiced unit price from the applicable line item on the invoice, as well as fields for a normalized product identifier variable, a normalized quantity variable, a normalized unit price variable, and a price-correlated product identifier variable;

receiving a retailer receiving invoice;

creating a computer-readable record for the retailer receiving invoice, wherein the record for the retailer receiving invoice includes an entry for each line item in the retailer receiving invoice, and wherein each entry includes an invoiced product identifier, an invoiced quantity, and an invoiced unit price from the applicable line item on the invoice, as well as fields for a normalized product identifier variable, a normalized quantity variable, a normalized unit price variable, and a price-correlated product identifier variable;

matching the retailer receiving invoice to a vendor invoice;

for each entry in each of the record for the retailer receiving invoice and the record for the matched vendor invoice, determining a value for the normalized product identifier variable for the entry by performing the following:

determining whether the invoiced product identifier for the entry is in a master product database for a plurality of products, wherein, for each product in the master product database, the master product database includes (1) a hierarchical family of product identifiers, each corresponding to a quantity unit in which the product is available, and (2) an upper price limit and a lower price limit for each product identifier;

in response to the invoiced product identifier for the entry matching a product identifier in a family of product identifiers in the master product database, performing the following:

retrieving a product identifier in the family that corresponds to a select quantity unit, wherein the same select quantity unit is used for all entries in both the record for the retailer receiving invoice and the record for the matched vendor invoice;

setting the value of the normalized product identifier variable for the entry to the retrieved product identifier in the family;

for each entry in each record, calculating the value of the normalized unit price and quantity variables for the entry by performing the following:

determining whether the invoiced unit price for the entry is within the upper and lower price limits associated with the invoiced product identifier for the entry in the product database;

in response to the invoiced unit price for the entry being within the upper and lower price limits, concluding that the invoiced product identifier for the entry correlates with the invoiced unit price for the entry and setting the value of the price-correlated product identifier variable for the entry to the invoiced product identifier for the entry;

in response to the invoiced unit price for the entry not being within the upper and lower price limits associated with the invoiced product identifier for the entry, performing the following:

concluding that the invoiced product identifier for the entry does not correlate with the invoiced unit price for the entry;

determining whether the invoiced unit price for the entry falls within the upper and lower price limits associated with another product identifier in the family of product identifiers;

in response to determining that the invoiced unit price for the entry falls within the upper and lower prices limits of another product identifier in the family of product identifiers ("the identified product identifier"), concluding that the identified product identifier correlates with the invoiced unit price for the entry and setting the price-correlated product identifier variable for the entry to the identified product identifier, otherwise concluding an invoicing error occurred;

determining whether the price-correlated product identifier for the entry is a base item in the family of product identifiers;

in response to determining that the price-correlated product identifier for the entry is a base item in the family of product identifiers, setting the normalized unit price and quantity fields for the entry to the invoiced unit price and quantity for the entry;

in response to determining that the price-correlated product identifier for the entry is not a base item in the family of product identifiers, converting the invoiced unit price and invoiced quantity from the price-correlated product identifier units to base unit values and setting the normalized unit price and quantity fields for the entry to the calculated unit price and quantity in base unit values;

determining whether entries in the record for the retailer receiving invoice and the record for the matched vendor invoice are for the same product by comparing the normalized product identifier fields in each record;

flagging any non-matching entries as unmatched products;

for each matching entry pair, comparing the normalized quantity and normalized unit price fields for the entries to determine if there are any quantity or unit price discrepancies between the corresponding line items in the retailer receiving and matched vendor invoices;

in response to determining that there is a quantity or unit price discrepancy between the corresponding line items in the retailer receiving and matched vendor invoices, determining if the discrepancy matches a previously-issued credit; and in response to determining that the discrepancy matches a previously-issued credit, the discrepancy is marked as resolved.

5. The one or more non-transitory, computer-readable media of claim 4, wherein the method further comprises matching the retailer receiving invoice to a vendor invoice by performing the following:

determining if the retailer receiving invoice matches a vendor invoice in the following fields: retailer name, store number, invoice number, and invoice date; and in response to the retailer receiving invoice matching a vendor invoice in the fields, determining that the retailer receiving invoice corresponds to the vendor invoice.

6. The one or more non-transitory, computer-readable media of claim 4, wherein determining if the discrepancy matches a previously-issued credit comprises (i) identifying credits issued by the same vendor as the vendor of the line item on or after the date of the vendor invoice and (ii) by normalizing the product identifier, quantity, and unit prices referenced in the credit, and comparing the normalizing product identifier, quantity, and unit price associated with the credit with the normalized product identifier, quantity, and unit price associated with the discrepancy.

7. A computer system comprising one or more computing devices having one or more physical, computer-readable storage media and one or more processors for dynamically reconciling a retailer receiving invoice with a vendor invoice for products sold and invoiced under multiple product identifiers and in multiple units of quantity, the system comprising:

the one or more processors;

the one or more physical, computer-readable storage media coupled to the one or more processors, wherein the one or more physical, computer-readable storage media store instructions that, when executed by the one or more processors, cause the system to perform the operations of:

maintaining a computer-readable record for each vendor invoice, wherein the record for each vendor invoice includes an entry for each line item in the vendor invoice, and wherein each entry includes an invoiced product identifier, an invoiced quantity, and an invoiced unit price from the applicable line item on the invoice, as well as fields for a normalized product identifier variable, a normalized quantity variable, a normalized unit price variable, and a price-correlated product identifier variable;

receiving a retailer receiving invoice;

creating a computer-readable record for the retailer receiving invoice, wherein the record for the retailer receiving invoice includes an entry for each line item in the retailer receiving invoice, and wherein each entry includes an invoiced product identifier, an invoiced quantity, and an invoiced unit price from the applicable line item on the invoice, as well as fields for a normalized product identifier variable, a normalized quantity variable, a normalized unit price variable, and a price-correlated product identifier variable;

matching the retailer receiving invoice to a vendor invoice;

for each entry in each of the record for the retailer receiving invoice and the record for the matched vendor invoice, determining a value for the normalized product identifier variable for the entry by performing the following:
  determining whether the invoiced product identifier for the entry is in a master product database for a plurality of products, wherein, for each product in the master product database, the master product database includes (1) a hierarchical family of product identifiers, each corresponding to a quantity unit in which the product is available, and (2) an upper price limit and a lower price limit for each product identifier;
  in response to the invoiced product identifier for the entry matching a product identifier in a family of product identifiers in the master product database, performing the following:
    retrieving a product identifier in the family that corresponds to a select quantity unit, wherein the same select quantity unit is used for all entries in both the record for the retailer receiving invoice and the record for the matched vendor invoice;
    setting the value of the normalized product identifier variable for the entry to the retrieved product identifier in the family;
for each entry in each record, calculating the value of the normalized unit price and quantity variables for the entry by performing the following:
  determining whether the invoiced unit price for the entry is within the upper and lower price limits associated with the invoiced product identifier for the entry in the product database;
  in response to the invoiced unit price for the entry being within the upper and lower price limits, concluding that the invoiced product identifier for the entry correlates with the invoiced unit price for the entry and setting the value of the price-correlated product identifier variable for the entry to the invoiced product identifier for the entry;
  in response to the invoiced unit price for the entry not being within the upper and lower price limits associated with the invoiced product identifier for the entry, performing the following:
    concluding that the invoiced product identifier for the entry does not correlate with the invoiced unit price for the entry;
    determining whether the invoiced unit price for the entry falls within the upper and lower price limits associated with another product identifier in the family of product identifiers;
    in response to determining that the invoiced unit price for the entry falls within the upper and lower prices limits of another product identifier in the family of product identifiers ("the identified product identifier"), concluding that the identified product identifier correlates with the invoiced unit price for the entry and setting the price-correlated product identifier variable for the entry to the identified product identifier, otherwise concluding an invoicing error occurred;
  determining whether the price-correlated product identifier for the entry is a base item in the family of product identifiers;
  in response to determining that the price-correlated product identifier for the entry is a base item in the family of product identifiers, setting the normalized unit price and quantity fields for the entry to the invoiced unit price and quantity for the entry;
  in response to determining that the price-correlated product identifier for the entry is not a base item in the family of product identifiers, converting the invoiced unit price and invoiced quantity from the price-correlated product identifier units to base unit values and setting the normalized unit price and quantity fields for the entry to the calculated unit price and quantity in base unit values;
determining whether entries in the record for the retailer receiving invoice and the record for the matched vendor invoice are for the same product by comparing the normalized product identifier fields in each record;
flagging any non-matching entries as unmatched products;
for each matching entry pair, comparing the normalized quantity and normalized unit price fields for the entries to determine if there are any quantity or unit price discrepancies between the corresponding line items in the retailer receiving and matched vendor invoices;
in response to determining that there is a quantity or unit price discrepancy between the corresponding line items in the retailer receiving and matched vendor invoices, determining if the discrepancy matches a previously-issued credit; and
in response to determining that the discrepancy matches a previously-issued credit, the discrepancy is marked as resolved.

8. The computer system of claim 7, wherein the system matches the retailer receiving invoice to a vendor invoice by performing the following:
  determining if the retailer receiving invoice matches a vendor invoice in the following fields: retailer name, store number, invoice number, and invoice date; and
  in response to the retailer receiving invoice matching a vendor invoice in the fields, determining that the retailer receiving invoice corresponds to the vendor invoice.

9. The computer system of claim 7, wherein determining if the discrepancy matches a previously-issued credit comprises (i) identifying credits issued by the same vendor as the vendor of the line item on or after the date of the vendor invoice and (ii) by normalizing the product identifier, quantity, and unit prices referenced in the credit, and comparing the normalizing product identifier, quantity, and unit price associated with the credit with the normalized product identifier, quantity, and unit price associated with the discrepancy.

* * * * *